United States Patent [19]

Labrie

[11] Patent Number: 4,839,118
[45] Date of Patent: Jun. 13, 1989

[54] METHOD OF FABRICATING AN INTERIOR TRIM FOAM PRODUCT

[75] Inventor: Craig B. Labrie, Dover, N.H.

[73] Assignee: Davidson Textron Inc., Dover, N.H.

[21] Appl. No.: 230,572

[22] Filed: Aug. 10, 1988

Related U.S. Application Data

[63] Continuation of Ser. No. 39,680, Apr. 20, 1987, abandoned.

[51] Int. Cl.$^4$ .................. B29C 67/22; B29C 53/00
[52] U.S. Cl. .................. 264/46.5; 264/46.6; 264/249
[58] Field of Search .................. 264/46.5, 46.6, 46.7, 264/249

[56] References Cited

U.S. PATENT DOCUMENTS

| | | | |
|---|---|---|---|
| 3,303,255 | 2/1967 | Bracey | 264/249 |
| 3,308,225 | 3/1967 | Wells | 264/249 |
| 3,773,875 | 11/1973 | Lammers | 264/46.7 |
| 4,525,408 | 6/1985 | Johansson | 264/46.5 |

Primary Examiner—Jan H. Silbaugh
Assistant Examiner—Allan R. Kuhns
Attorney, Agent, or Firm—John C. Evans

[57] ABSTRACT

A vehicle interior part such as a glove box door or console door and its method of manufacture includes an outer shell backed by foam material which is bonded to a mold insert that reinforces the part and defines an exposed back. The insert includes a peripheral edge spaced with respect to a continuously formed raw peripheral edge of the shell and further includes a flange portion that is post formed so as to be bonded to and located in a net out relationship with the raw edge to define a finished surface appearance. The door is formed by a process that includes the steps of providing a composite plastic structure having a molded shell and foam component with an insert located in spaced relationship with respect to the shell to define a foamed cavity with a raw edge of foam and shell around the periphery of the composite member; providing a post formed flange on the insert and loading the shell, foam and insert components into a female nest; and heat die post forming of the flange to upset it into net out overlying relationship with both the raw edge of the shell and the exposed edge of foam formed in the composite part so as to produce a finished exterior surface on the composite part.

4 Claims, 3 Drawing Sheets

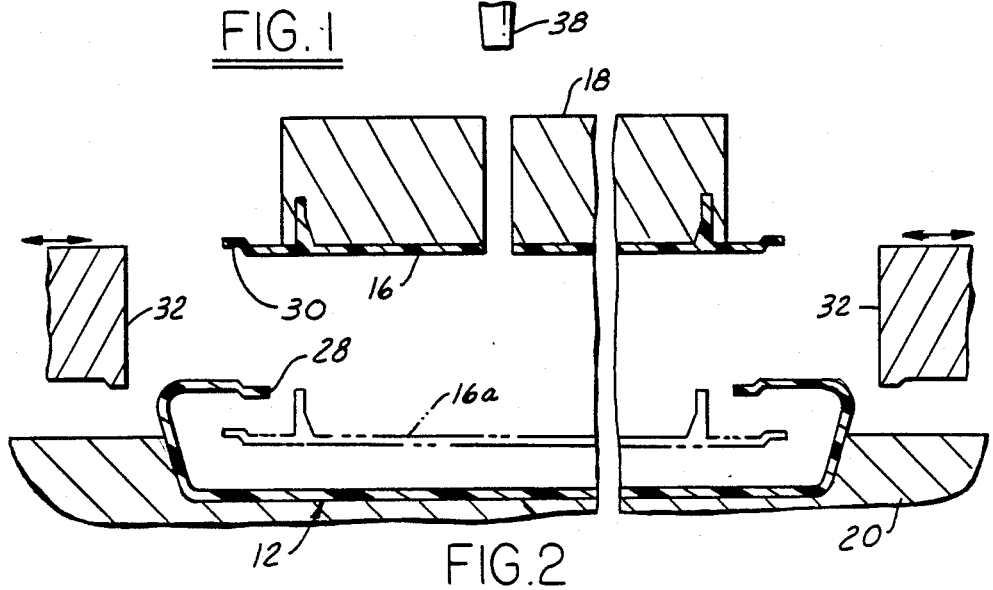
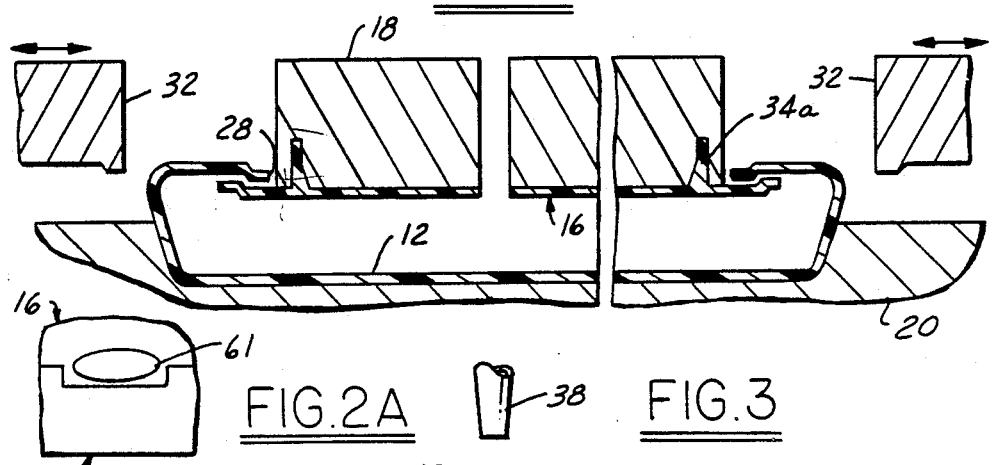
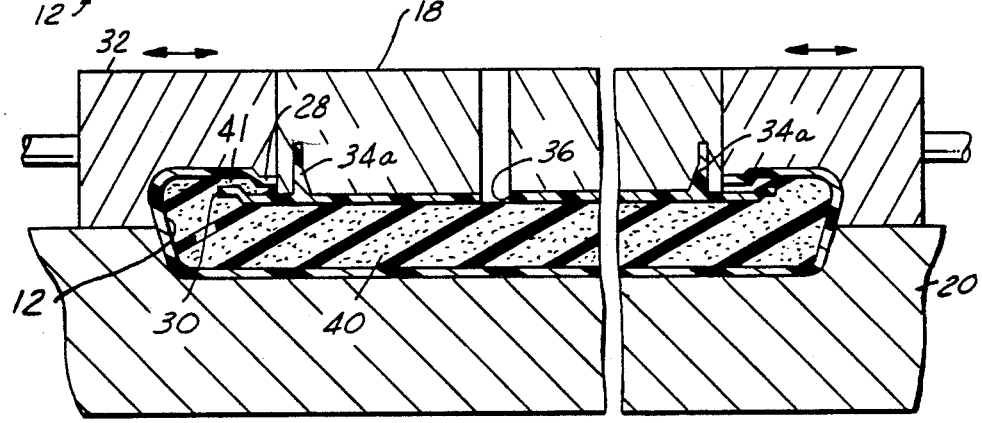

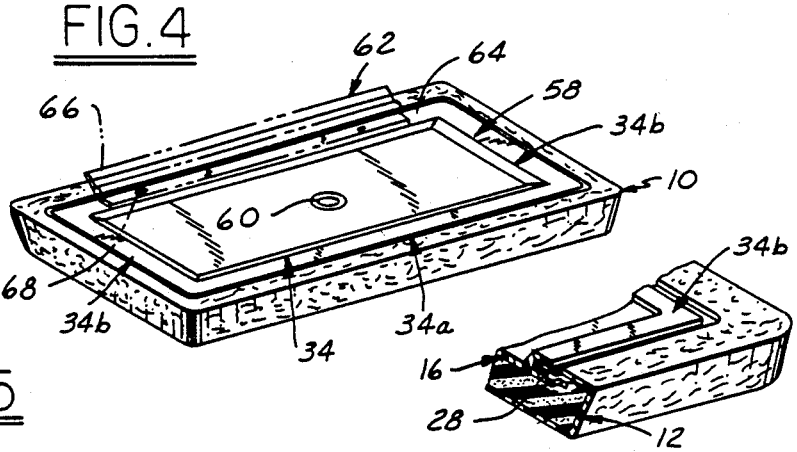
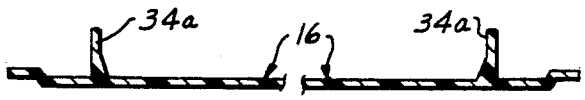
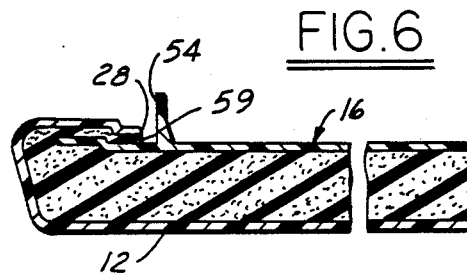
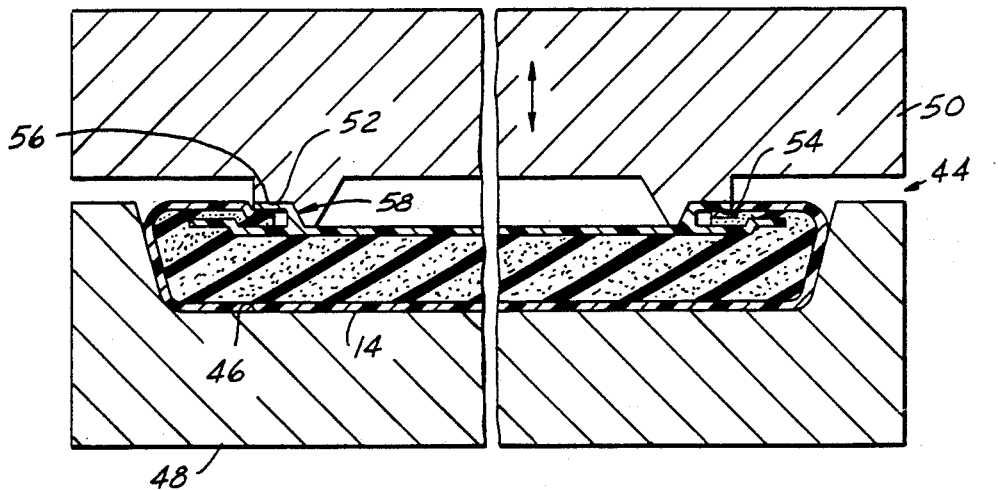

METHOD OF FABRICATING AN INTERIOR TRIM FOAM PRODUCT

This is a continuation of application Ser. No. 039,680, filed on Apr. 20, 1987 now abandoned.

TECHNICAL FIELD

The subject invention relates to a foamed interior trim products for the interior of a vehicle and its method of fabrication. More specifically, the subject invention is directed to a foamed article that includes a reinforcing insert configured and connected to an exterior shell component of a product to form a finished surface for connection to an interior vehicle body part.

BACKGROUND ART

Vehicle parts are known which include an outer shell foamed in place with urethane foam. In such cases, in order to connect the part to a structural component of the interior of a vehicle, an insert is provided to define a point for connection of the part by suitable fastening means to a vehicle interior part. An example of such composite structures is set forth in U.S. Pat. No. 3,123,403 issued Mar. 3, 1964, to Hood. In this arrangement, an automobile armrest is formed having two end portions thereon connected by screw fasteners to an interior body part. The point for connection of the armrest is an insert which is located on the interior of the automobile armrest.

Such composite structures have a finished shell component connected by a backing layer of cellular foam to an insert. Both the shell and insert are located in a molding apparatus in spaced relationship to form a cavity for the foam precursors which react to form the cellular backing for the shell and the bond connection between the insert and the shell. In such cases, the molded part is then joined to a separate backplate by suitable fastening means that connect to the insert and/or the shell to form an article which appears finished on both the interior and exterior portions of the final article. Composite structures like console or glove compartment doors can be configured to have shells formed from flexible polyvinyl chloride surfaces which blend with other components of a vehicle interior having a like covering. The backplate and covers raw edges of the molded insert and shell components. Consequently, there are no raw edges and foam flash that can catch clothes or the like when the door is opened.

U.S. Pat. No. 3,620,566 issued Nov. 16, 1971, discloses a passenger compartment armrest with a base plate held in place by welds. U.S. Pat. No. 3,773,875 issued Nov. 20, 1973, discloses a method for manufacturing a foamed article. The '566 patent and the '875 patent do not disclose use of an insert to cover raw edges of an intermediate composite structure.

STATEMENT OF INVENTION AND ADVANTAGES

In accordance with the subject invention, a vehicle interior trim part and method of manufacture is provided which eliminates the need for a separate backplate component and the need for it being fastened by suitable fastening means such as screws to foam molded shell and insert components of the part.

More specifically, the subject invention relates to a vehicle interior trim part such as door panels, clusters, armrests, consoles and instrument panel pads of the type having a foamed in place core bonded to and backing an outer skin of flexible material such as polyvinyl chloride material which is reinforced by a mold insert part that is located during the molding with respect to the raw edge of the outer shell to form a space therebetween into which the foam material is reacted and flowed to form a light weight cellular core. The present invention provides means on the mold insert that will serve to both cover the raw edge of the skin and to net out the insert to the outer skin so as to define a back for the part which is also bonded to the cellular core, thereby to eliminate a separate backing plate and its fasteners.

A further object of the present invention is to provide an improved method of manufacture interior vehicle trim parts that includes the steps of: preforming a part having an outer shell in the form of a flexible skin backed by a layer of cellular foam material that serves to bond the outer shell to a mold insert member that has a planar extent to extend across the full planar extent of an area bounded by a raw peripheral edge of the shell and wherein the foam material is flowed between the raw edge of the shell and an outer peripheral surface of the insert; and providing the insert with an as-molded post formed flange located in close proximity to the raw edge of the preformed part and extending in a generally perpendicular relationship with the surface of the insert; and thereafter placing the preformed skin, foam and insert components in a female nest and supporting the preformed components with respect to a heat and pressure source to apply heat and pressure to the insert flange causing it to be post formed into overlying relationship with the raw edge of the shell to cover both the raw edge of the shell and exposed foam between the insert and the raw edge thereby to define a finished rear wall surface.

In accordance with other principles of the present invention, a mold insert of plastic material is formed with a heat deformable feature thereon that can be displaced to cover the raw edge and exposed foam parts of a preformed part having an outer shell of flexible polymeric material backed by a core of foamed material and wherein the feature is configured to pinch off both the raw edge and the exposed foam portion of the preformed parts thereby to form a finished back surface.

A further object of the present invention is to provide a vehicle interior trim part for use as a vehicle interior trim and a method of fabrication of such vehicle door in which a mold is used to fabricate a door composite having an outer shell, a backing of cellular foam material and a mold insert wherein the mold insert is premolded to have a vertical flange; and wherein the vertical flange is post formed to define a finished edge that covers raw edge of foam and shell material.

Other advantages of the present invention will be readily appreciated as the same becomes better understood by reference to the following detailed description when considered in connection with the accompanying drawings wherein:

BRIEF DESCRIPTION OF DRAWINGS

FIGS. 1-3 are diagrammatic views of mold tooling to form a composite structure including an outer shell and mold insert component to provide a cellular foam backing with respect to the shell;

FIG. 2a is a fragmentary view of an alternative gate location;

FIG. 4 is a perspective view of a composite plastic door structure;

FIG. 4a is a fragmentary view of a corner of the structure;

FIG. 5 is a section view of an insert component of the composite structure formed in the mold tooling of FIGS. 1-3;

FIG. 6 is a sectional view of the composite structure made by the molding apparatus of FIGS. 1-3; and FIG. 7 is a sectional view of a heat die formation of the insert to form a raw edge cover in the door structure of FIG. 4.

DETAILED DESCRIPTION OF THE INVENTION

Figure 8A:
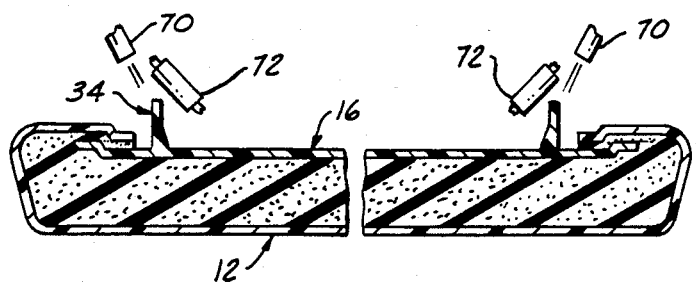
FIGS. 8A-8D are diagrammatic views of a hot air heater and roller assembly for practicing a second method of the invention.

The article of the present invention and its method of manufacture will be described with reference to a composite plastic door such as a glove box door or a console door for use in association with the interior automotive body assembly.

FIG. 4 shows a representative type of glove compartment door 10. The door includes an outer shell or skin 12 of flexible grained polyvinyl chloride material which can be formed by a process of the type set forth in U.S. Pat. No. 4,562,032 thereby to retain a highly grained appearance on the exterior shell face 14. An insert 16 forms the back of the door 10.

The mold tooling apparatus in the present invention is configured as shown in FIGS. 1-3 to form a preformed part. A cover 18 of the mold apparatus supports the mold insert 16 in spaced relationship to a mold cavity part 20. Alternatively, the insert 16 can be preloaded as shown in dotted line at 16a in FIG. 2. Cavity part 20 supports the outer shell 12.

More specifically, the insert 16, as shown in FIGS. 1 and 5, is a plastic part having a planar extent 24 substantially equal to that of an opening 26 in the outer shell 12 which is defined by a raw edge 28 formed thereon around the periphery of the outer shell 12. The insert 24 includes a peripheral edge 30 that is located by the mold cover 18 to be located in close spaced relationship to the raw edge 28 which is turned thereover by pivotal tool inserts and/or slides 32 as shown in FIGS. 2 and 3 to cover the edge 30. The insert 24 more particularly includes an integral post formed flange 34 with segments 34a on the sides and 34b on the ends of the insert 24 to be located in close relationship with the distal end of the raw edge 28. Each segment 34a, 34b is arranged generally perpendicularly with respect to a planar extent 35 on the insert 24. The cover 32 is closed and sealed with respect to the mold cavity part 20. The insert 24 includes an opening 36 for receiving foam precursors from a foam pour nozzle 38 which will feed the foam precursors into a cavity 40 formed between the mold supported outer shell 12 and the mold supported insert 24. The foam precursors react within the cavity and flow into a peripheral space 41 formed around the spaced insert 24 and the shell at the outer edges thereof.

Following reaction of the foam, an intermediate composite structure 42 is removed from the molding apparatus of FIG. 1 which is of the configuration shown in FIG. 6. The intermediate composite structure 42 thus includes an exterior surface defined by the outer shell 12. On the back side of the part, a raw edge of foam and vinyl are formed continuously around the insert 24 at a point adjacent the vertical flange 34 thereon.

After completing the intermediate composite structure 42, it is loaded into a heated die assembly 44. More particularly, the outer or exterior face 14 of the outer shell 12 is rested against the inner surface 46 of a female nest 48. The female nest is configured to support the exterior shell face 14 so that it will remain unblemished during the post forming operation. The post forming operation includes applying a heated die 50 against the flange 34 to cause it to be post formed from its vertical position. More particularly, the heat die includes a curved surface 52 thereon that will engage the distal end of the flange 34 as the heated die 50 is moved progressively toward the female nest. The curved surface 52 progressively deflects the flange 34 in an outward direction into an overlying relationship with the raw edge 28 until the face 54 of the flange 34 is juxtaposed against the outboard peripheral surface 56 of the outer shell 12. The heated die maintains heat and pressure on the post formed flange 34 to cause it to net out to the outer shell 12 and to form a continuously formed connector flange 58 that covers the raw edge 28 and the exposed foam portions 59 of the intermediate composite structure 42 a net out condition interface therebetween. The pour opening 36 in the insert is covered by a decorative plug 60. Alternatively, an end gate can be provided which is covered under the post formed flange 34 at the hinge mounting surface 64 by providing a notch in the edge of shell 12 and a hole 61 through insert 12 at the notch. In such case, the need for a decorative plug is eliminated. The glove compartment door 10 thus includes a back which has a finished appearance without raw edges. The construction eliminates the need for a separate backing plate and fasteners for securing such a separate backing plate to the insert. Nevertheless, because of the illustrated arrangement, the formed connector flange 58 can serve as a structural component for the connection of a hinge assembly 62. More particularly, the longitudinal reach 64 of the connector flange is arranged to support a first hinge plate 66. The first hinge plate 66 is connected to the connector flange by suitable fastening means such as screws 68 that can not only be connected to the connector flange 58, but can extend therethrough to be fastened to the inboard segment of the insert 16 which underlies the formed connector flange 58. The second hinge plate has holes therein that will receive suitable fastening means for connecting the second hinge plate to a structural portion of the vehicle interior to locate the door 10 in an open or closed position with respect to a glove compartment opening.

Figure 8B:
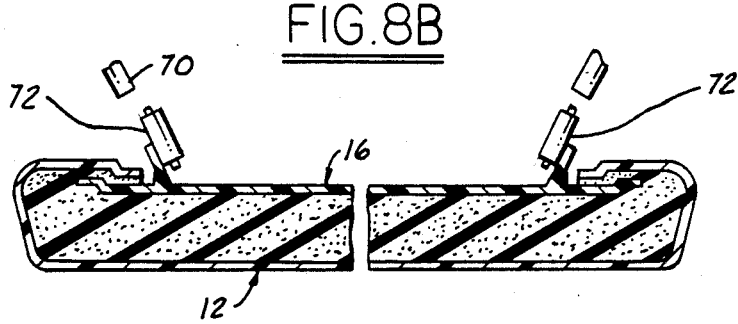
Figure 8C:
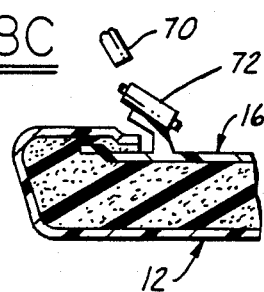
Figure 8D:
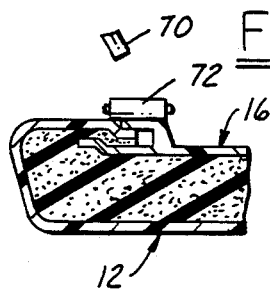

FIGS. 8A through 8D show steps of a second method embodiment. The flange 34 is first heated by hot air from blower 70 until it is in a reformable state. At this point a series of rollers 72 are sequentially passed over the flange 34 to cause it to be post formed over the raw edge of a shell.

The invention herein has been described in an illustrative manner and it is understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A method for fabricating a vehicle interior trim component having a flexible outer shell and an insert which forms an integral back on the trim component comprising the steps of:

providing a mold cavity part having a support surface thereon;

providing a mold cover and tool insert means operatively associated to close the mold cavity part;

providing an shell of flexible material having a raw peripheral edge thereon and supporting the shell by positioning the outer surface thereof on the support surface of the mold cavity part while spacing the raw peripheral edge from the mold cavity part to form a foam space;

providing a multisided, generally planar insert with a continuous peripheral edge, an inner and outer surface, and an integral flange directed perpendicularly to the outer surface and formed in spaced parallelism inside the peripheral edge around the perimeter thereof to define side flanges and end flanges on the insert having lengths corresponding to that of the raw peripheral edge;

locating the insert within the foam space to form a gap between the raw peripheral edge and the outer surface of the insert while locating the integral flange outside of the foam space and inboard of the raw peripheral edge;

directing foam precursors into the foam space and the gap and reacting them therein so as to form a foam core in the foam space and the gap and to bond the inner surface of the insert and the shell to the core;

providing a post forming die;

removing the foamed shell and insert from the mold cavity part and supporting the outer surface of the shell against the post forming die to locate the integral flange in an upwardly facing direction;

thereafter applying a force against the integral flange to cause it to bend about ninety degrees to overlie the raw peripheral edge for holding the raw edge in place while covering both the raw peripheral edge and the gap formed between the raw peripheral edge and the insert.

2. In the method of claim 1, providing a source of hot air and roller means, impinging the hot air against the flange to apply heat thereon, and applying pressure thereon by the roller means to cause the flange to post form into overlapping relationship with the raw edge of the shell.

3. In the method of claim 1, locating the insert with respect to the shell by preloading the insert into the mold cavity part.

4. In the method of claim 1, providing a heated die, and utilizing the heated die to apply a compression force on the flange to cause it to post form into overlapping relationship with the raw edge of the shell.

* * * * *